United States Patent
Rosenberg et al.

(10) Patent No.: US 6,560,450 B1
(45) Date of Patent: May 6, 2003

(54) SATELLITE COMMUNICATIONS ROUTING AND ADDRESSING METHOD

(75) Inventors: Catherine Rosenberg, Danbury (GB); Juan C. Zuniga, Ville Mont-Royal (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/368,839

(22) Filed: Aug. 5, 1999

(30) Foreign Application Priority Data

Jan. 11, 1999 (GB) .............................................. 9900515

(51) Int. Cl.[7] .............................................. H04B 7/185
(52) U.S. Cl. ........................ 455/316; 455/427; 455/428
(58) Field of Search ................................ 370/316, 328, 370/389; 455/427, 428, 430, 12.1

(56) References Cited

U.S. PATENT DOCUMENTS

| | | | | |
|---|---|---|---|---|
| 3,678,388 A | * | 7/1972 | Peterson | 358/326.01 |
| 5,115,433 A | * | 5/1992 | Baran | 370/400 |
| 5,408,237 A | * | 4/1995 | Patterson et al. | 342/354 |
| 5,430,729 A | * | 7/1995 | Rahnema | 370/409 |
| 6,151,497 A | * | 11/2000 | Yee et al. | 455/430 |
| 6,173,176 B1 | * | 1/2001 | Worger et al. | 455/428 |
| 6,301,231 B1 | * | 10/2001 | Hassan et al. | 370/316 |

* cited by examiner

Primary Examiner—Dwayne Bost
Assistant Examiner—Joy K. Contee
(74) Attorney, Agent, or Firm—Lee, Mann, Smith, McWilliams, Sweeney & Ohlson (57) ABSTRACT

A satellite packet communications system comprises a number of ground-based sectors serviced via satellite communications nodes in polar orbits. Each sector is provided with an address incorporating a binary Gray code. Routing of a packet arriving at a satellite node and addressed to a particular sector is determined from the Grey code in the packet header. A comparison is performed between the packet address and an address stored in the node, the number and bit position of the difference between the nodes being used to determine the direction in which that packet should be routed.

4 Claims, 11 Drawing Sheets

SATELLITE COMMUNICATIONS ROUTING AND ADDRESSING METHOD

This invention relates to an arrangement and method for routing packet traffic in a communications system incorporating non-geostationary satellite nodes, and to an addressing scheme or protocol for facilitating routing within the network.

BACKGROUND OF THE INVENTION

Conventional telecommunications networks comprise a number of nodes or switches interconnected by wireline or wireless links. Within such networks, traffic between terminals is routed via appropriate nodes and paths. As the topology of the network is substantially fixed, each node can be provided with a permanent or semi-permanent set of routing tables to facilitate traffic routing. Traditionally these networks carried voice traffic, but there is now an increasing interest in data transmission and in particular in packet switching. There are two main types of packet switching, namely connection-oriented packet switching and connectionless packet switching.

Connectionless network operation has been traditionally used in data communications in order to achieve two objectives, firstly to allow client/server operation between endpoints of a network with all intelligence distributed to the endpoints and secondly to allow topological change within the network to occur without the network endpoints needing to be aware that a change has happened. Networks based on the Internet Protocol (IP) are typical embodiments of these principles. Similar principles are embodied in wireless networks in order to avoid the need for explicit connection hand-overs due to the physical mobility of users or systems.

Communications systems are now being developed in which the system nodes comprise a constellation of non-geostationary satellites, e.g. low earth orbit (LEO) satellites. These systems comprise a ground segment incorporating e.g. ground stations, gateways and user terminals, and a space segment comprising the satellite network in which each satellite functions as a switch or a router. It will be appreciated that the topology of such a system is constantly changing as the satellites move relative to the earth's surface and to each other. In a proposed system, a large number of satellite communications nodes are placed into circumpolar orbits, there being a number of satellites evenly distributed around each orbit so as to provide coverage of much or all of the global surface. Communication with the ground is effected via up-links and down-links to ground stations. Movement of the satellites relative to the ground stations is accommodated by appropriate hand-over procedures. A typical system of this type comprises two hundred and eighty eight satellites divided into twelve orbital planes for the initial phase, this phase being planned to cover 95% of the landmass. Further satellites may be added in the future. The system embodies inter-satellite links (ISL) not only for intra-plane and inter-plane node communications, but also at the cross-seam. Some of these ISLs can be turned on or off at appropriate times. The space segment of the satellite network results in a geodesic topology network that provides good tolerance to faults and congestion and has a symmetrical structure.

Usually these networks rely on connectionless packet switching in order to avoid the need both to store connection state information and to preserve sequence integrity of the packets.

A particular problem in such a system is that of routing traffic between two ground based terminals via a succession of satellite nodes. It will be appreciated that, routing in a network that is changing topology rapidly because the satellite coverage is time varying, the inter-satellite links are dynamic. Depending on the satellite position, some of these links can be off or on, and some are always on. It will also be appreciated that, because the satellites are moving thus constantly changing the network topology in a complex manner, a routing table based routing would require continual updates. Moreover, an accurate routing would require every satellite to be well aware of the topological changes in the space segment. This could be done by storing all the information in the satellites, but this would be very costly since the topological changes are extremely complex even if there are in principle predictable and a large amount of information storage and processing would thus be required. Another way would be to require each satellite to send topological information to its neighbours (for example). This also would be very costly in terms of overheads due to the fast pace at which the topology is changing.

Routing in a connectionless packet switched network is a function that relies on an addressing scheme. Smart addressing scheme can ease a lot the burden of the routing function.

A discussion of satellite communications routing techniques is provided by Markus Werner et al, ATM-Based Routing in LEO/MEO Satellite Networks with Inter-satellite Links. IEEE Journal on Selected Areas in Communications, January 1997, and by Markus Werner, A Dynamic Routing Concept for ATM-Based Satellite Personal Communication Networks. IEEE Journal on Selected Areas in Communications, October 1997.

Reference is also directed to our co-pending application Ser. No. 09/017,360, the contents of which are incorporated herein by reference, and which describes diversion routing of packet traffic in a satellite communications system.

SUMMARY OF THE INVENTION

An object of the invention is to provide an improved arrangement and method for addressing and routing in satellite communications networks.

According to a first aspect, the invention provides a hierarchical addressing protocol for a communications network incorporating satellite nodes, the protocol being based on a Gray code in which the ground segment of the network is partitioned into sectors each represented by a respective Gray code.

Each sector is further partitioned into sub-sectors and each sub-sector in cells. The first Gray code representing the sector transforms a three dimensional problem into a two dimensional one.

According to another aspect of the invention, there is provided a hierarchical addressing scheme for a packet communications network comprising a plurality of sectors each sector being partitioned into sub-sectors and each sub-sector into cells serviced via communications nodes whereby communications packets are routed, wherein each network sector is allocated a respective binary Gray code address, wherein adjacent sectors within the network have Gray codes differing by one bit.

According to another aspect of the invention, there is provided a satellite packet communications system comprising a plurality of ground based terminals disposed in cells contained in sectors and serviced via satellite communications nodes, wherein said cells are provided each with an address incorporating a hierarchical addressing scheme based on binary Gray codes, and wherein routing of a communications packet addressed to a said terminal within a said cell is performed in a satellite node by comparison of the packet address with corresponding addresses stored in the satellite.

The addresses stored in the satellite are the ones of the cells currently covered by the satellite as well as those of the sectors and sub-sectors currently partly covered by the satellite. This routing allows the packet to be transported by the space segment up to the cell comprising the destination terminal or gateway. Further addressing and routing is necessary to route the packet up to its destination. The comparison performed in the satellite of the address of destination cell of the packet with the stored addresses is done in a hierarchical way (to simplify it) and the number and bit position of the difference between said codes is used to determine the direction of routing of the packet to another satellite (through the appropriate ISL) or to its destination cell.

In a preferred embodiment, means are provided for between appropriate ISLs if the above scheme provides a choice of more than one ISL. In that case, the ISL can be chosen using shortest queue or other criteria.

According to another aspect of the invention, there is provided a satellite packet communications system comprising a plurality of ground based terminals serviced via satellite communications nodes, wherein said cells are provided each with an address incorporating the above hierarchical addressing scheme based on binary Gray codes, and wherein routing of a communications packet addressed to a said terminal within a said cell is performed in a satellite by comparison of the packet address with corresponding addresses stored in the satellite.

The addresses stored in the satellite are the ones of the cells currently covered by the satellite as well as those of the sectors and sub-sectors currently partly covered by the satellite plus the addresses of the sectors and sub-sectors also partly covered by the neighbouring satellites. This routing allows the packet to be transported by the space segment up to the cell comprising the destination terminal or gateway. Further addressing and routing is necessary to route the packet up to its destination. The comparison performed in the satellite of the address of the destination cell of the packet with the stored addresses is done in a hierarchical way (to simplify it) and the number and bit position of the difference between said codes is used to determine the direction of routing of the packet to another satellite (through the appropriate ISL) or to its destination cell.

According to another aspect of the invention, there is provided a method of routing packet traffic in a communications network serving a plurality of service regions and comprising a plurality of non-stationary nodes interconnected via inter-nodal links, the method comprising allocating to each said service region a respective binary Gray code element, providing said Gray code element as a destination address in an information packet intended for that service region, and determining within a said node the difference between said Gray code and a corresponding code stored at the node whereby to determine from the number and bit position of the difference between said codes being used to determine the direction of routing of the packet to another system node or to its destination sector.

According to another aspect of the invention there is provided a method of routing of packet communications traffic at a satellite node in a communications network comprising a constellation of non-geostationary satellites servicing a plurality of ground based cells via up-links and down-links, there being inter-satellite communications links between adjacent satellites, the method comprising providing a said packet with a destination address incorporating binary Gray codes corresponding to the destination cell of that packet, and, at a said node, comparing the Gray code address of that packet with address codes corresponding to the current position of the satellite so as to provide a simple determination of the direction in which that packet should be routed to an adjacent satellite over a said inter-satellite link.

The technique provides a routing strategy that is simple, robust, efficient, that does not require a large amount information to be stored in the satellite and does not require a large number of exchanges of information between satellites.

BRIEF DESCRIPTION OF THE DRAWINGS

Embodiments of the invention will now be described with reference to the accompanying drawings in which.

DESCRIPTION OF PREFERRED EMBODIMENT

Figure 1:
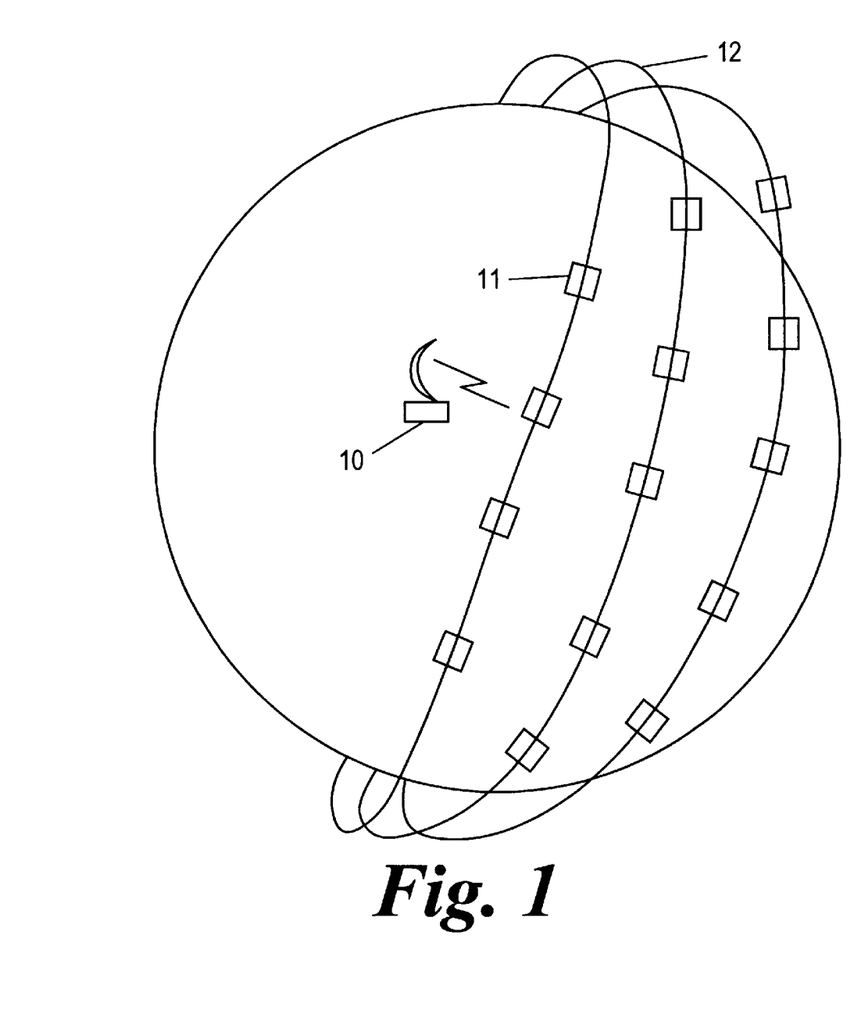
FIG. 1 is a schematic diagram of a global low earth orbit (LEO) satellite communications system.

Referring to FIG. 1, this shows an exemplary satellite constellation comprising a plurality of non-geostationary satellites 11 in a number of polar low earth orbits 12. It will of course be appreciated that FIG. 1 represents a 'snapshot' view of the system as all the satellites will be moving relative to the Earth's surface. The system carries packet traffic between ground stations 10 via one or more of the satellite nodes 11. Each packet is provided with a header incorporating a destination address which is read or decoded by a satellite node on arrival of the packet and is used by the node to determine routing of that packet. This destination address comprises the address of the cell to which the packet should be sent and the address necessary to reach the destination from the cell.

It will be appreciated that, although the satellites are placed in near circular orbits, the orbit characteristics will be adjusted to eliminate any risk of collision at the North and South polar regions or 'seams' of the orbital system. At the seams there will thus be satellites at different altitudes and moving in mutually opposite directions. It will of course be appreciated that it is not essential for the seams to be aligned with the poles.

In the system of FIG. 1, all the satellites have substantially identical characteristics in terms of capacity of the links and processing capabilities. Each satellite 11 behaves as an independent switch in the sky, connected to the earth or ground segment via the up-links 13 and down-links 14 (see FIG. 1a) and to adjacent satellites via the inter-satellite links (ISL) 15, 16. There are three kinds of ISL: intra-plane links 15, inter-plane links 16, and a variation of these latter that are referred to as cross-seam links.

Figure 1A:
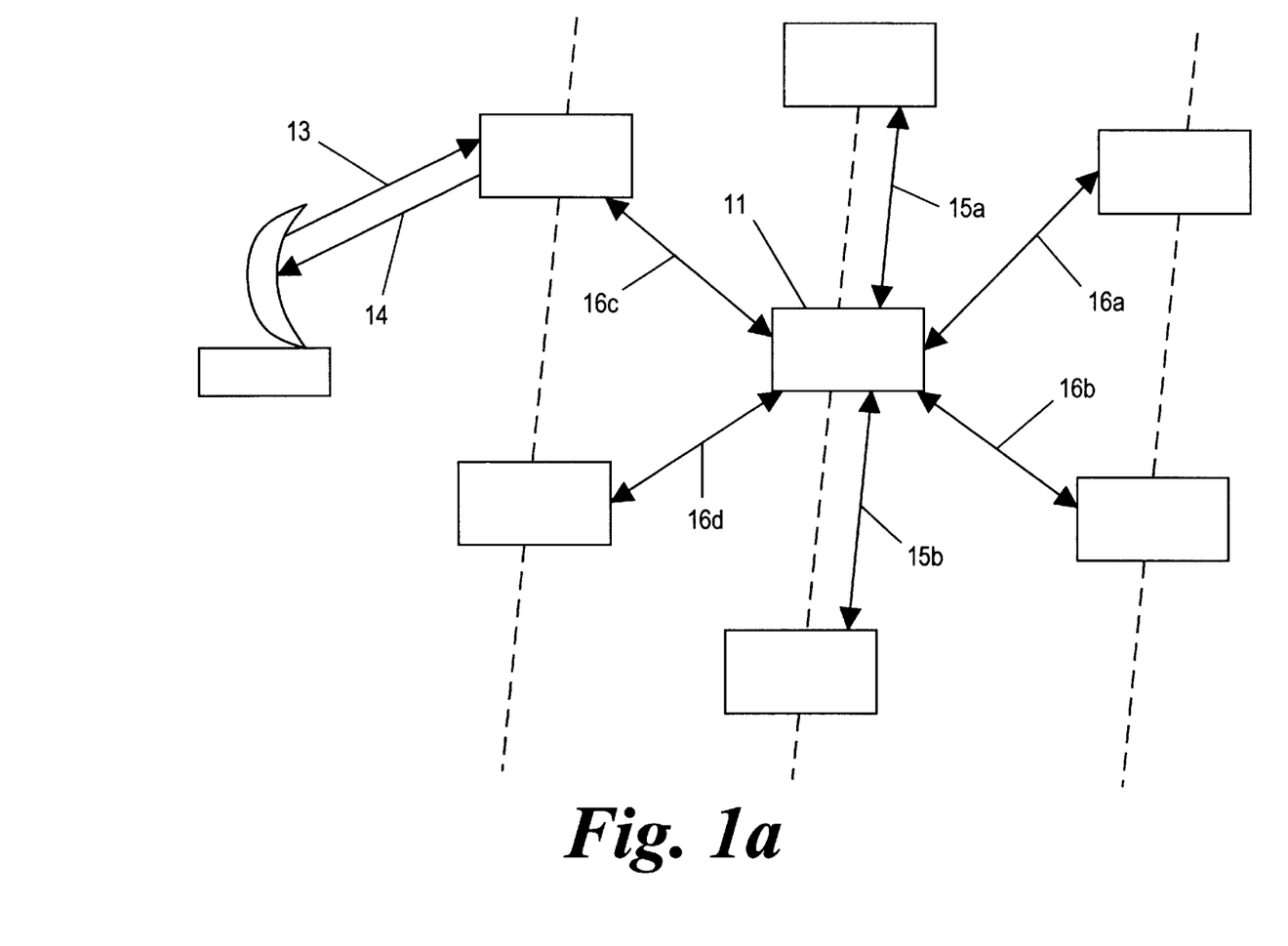
FIG. 1a shows a small part of the satellite constellation of FIG. 1.

In the network of FIGS. 1 and 1a, here are two intra-plane links 15 per satellite 11, one pointing forward and one backward to the adjacent satellites 11a and 11b in the same orbital plane 12. Both these intra-plane links are in service permanently. There are two further types of inter-satellite links, these being termed inter-plane and cross seam links respectively. As shown in FIG. 1a, the inter-plane links 16 are directed towards the neighbouring satellites in adjacent orbits at each side of the orbital plane 12; that is, for a constellation with near pole orbits, there would be two links 16c and 16d to neighbours 11c and 11d in the West direction and two links 16e and 16f to neighbours 11e and 11f in the East direction. Since the orbital planes suffer a small shift in time, these inter-plane ISLs require switching from one satellite to other from time to time. Usually this task is performed twice every orbit period. For example, in a network in which, the orbit period is about 2 hours, a specific inter-plane ISL would last for something less than one hour.

The most dynamic inter-satellite links (ISL) are the cross-seam links 16g. Due to the crossing between the edge orbit planes, at the cross-seams at the polar regions, the satellites are in those orbits are moving in opposite directions. This means that the switching between satellites will be much faster. For the exemplary two hundred and eighty eight satellite model referred to above, a cross-seam inter-satellite link would last typically for 4.5 min, depending on the configuration of the system, having to perform a hand-over to the incoming satellite after this period.

Figure 6:
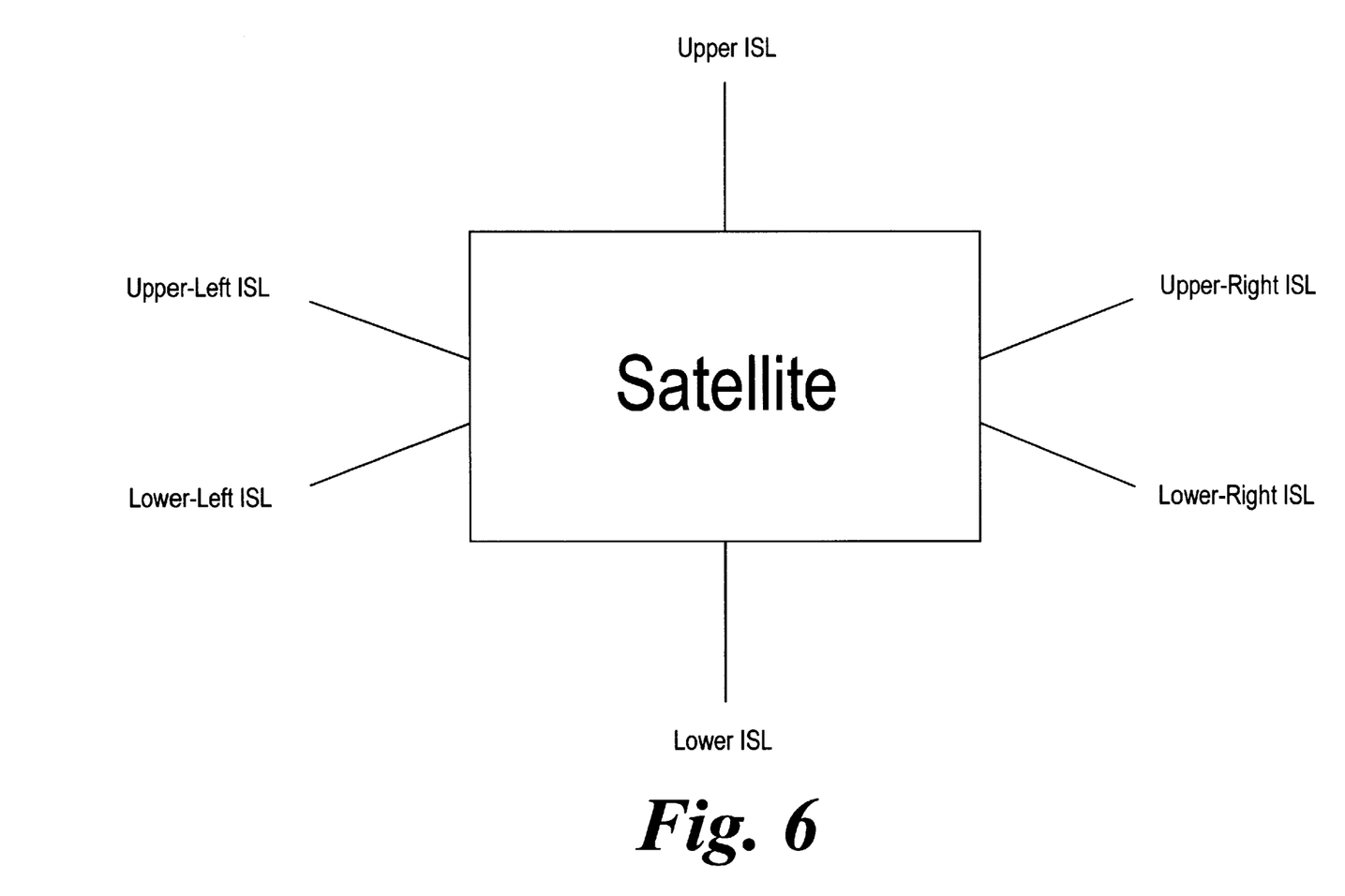
FIG. 6 illustrates schematically the direction of each ISL of a satellite.

FIG. 6 illustrates schematically the (arbitrary) directions to which the ISLs point towards, namely the upper, the lower, the upper right, the lower right, the upper left and the lower left directions. Each time the satellite crosses the pole, the directions towards which the ISLs point are updated. When the satellite crosses the pole, the upper right ISL becomes lower left ISL, the lower right ISL becomes upper left ISL and the lower ISL becomes upper ISL. The lateral ISLs could be turned off from time to time, in that case, if say the lower right is off, the traffic that would have been sent to it will go to the upper right.

The up-links and down-links cover a certain number of earth fixed-size cells at a time. This coverage varies depending on the instantaneous latitude of the satellite. The cells are relatively small, if compared to the footprint of the satellite. For example, the number of cells covered by a satellite for a near-pole orbit model would reach its maximum at the equator, and it would be in the order of three hundred and sixty four cells.

The packets contain a header which includes a destination address and a sequence field. The payload in the packet contains the encoded user data, which can be from any kind of multimedia service and can include, for example, voice, video or data. The terminals at the edges of the satellite network carry out the coding and decoding of this data.

Routing of the packets at the satellite nodes is performed via a connectionless, Gray-code based routing algorithm. This algorithm which will be described below requires low processing complexity at the on-board switch in the satellite.

Figure 11:
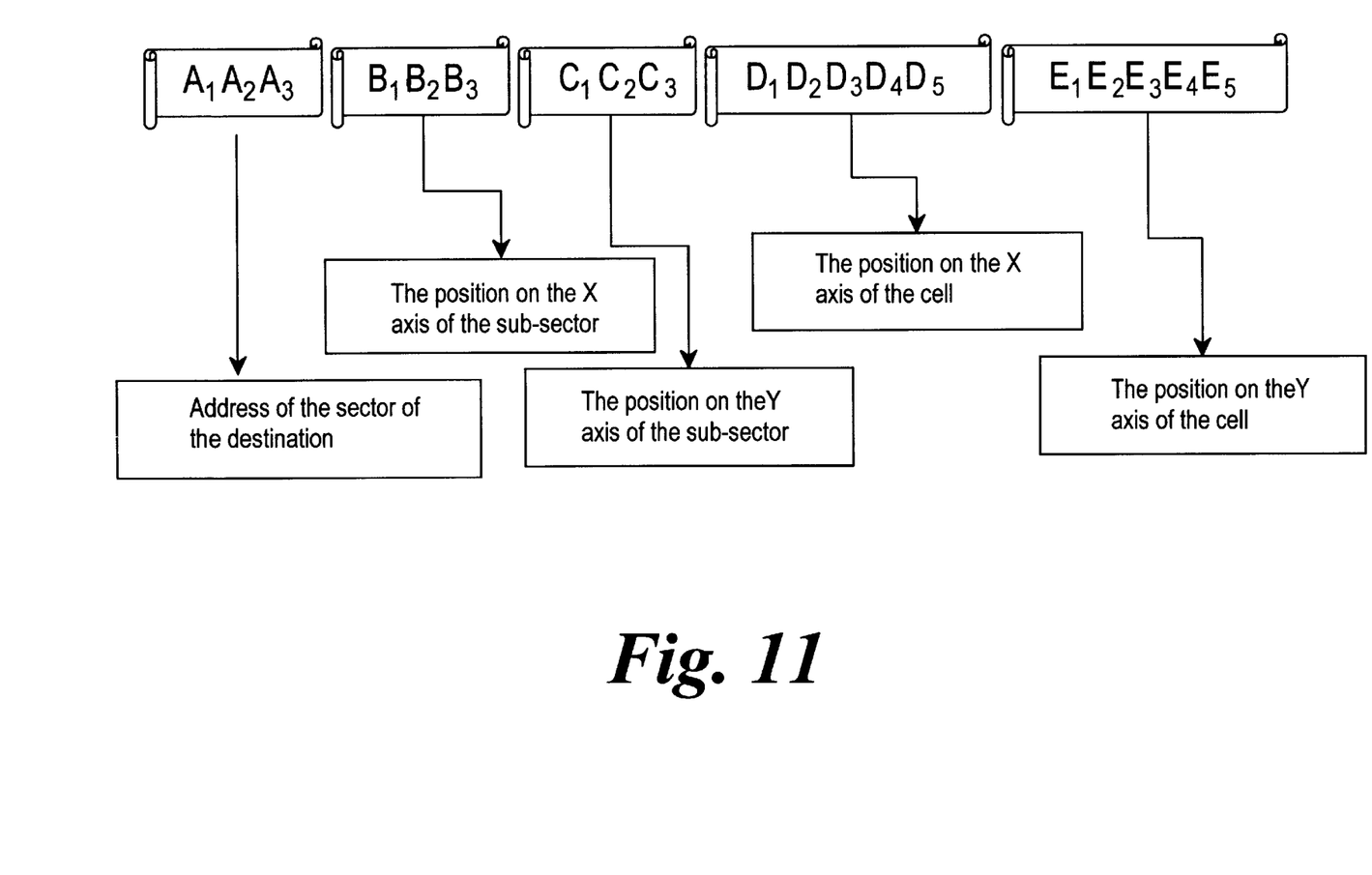
FIG. 11 illustrates the hierarchical structure of the address of the destination cell.

This algorithm is based on a fixed-earth-addressing scheme (shown schematically in FIGS. 2, 3 and 11), which is independent of the number of satellites in the network or the links between them. This assumption avoids the problems of upgrading the algorithm for new stages of the network when more satellites are subsequently added to the constellation. Furthermore, the processing of the packets is carried out at each satellite in a hop-by-hop basis. The algorithm is bit-oriented, so it requires low memory, low information exchange between satellites, and it can be hardware-implemented.

Since the algorithm is connectionless and requires the reordering of packets at the terminals, it may with advantage be used to carry best-effort packet services over the network.

In order to solve the routing of packets travelling on the network via the satellite nodes, a hierarchical location-addressing scheme is used in which the ground segment is hierarchically divided into sectors, sub-sectors and cells.

In the exemplary polar-oriented constellation described herein, the footprint of each satellite reaches its maximum at the equator where the coverage is equivalent to three hundred and sixty four cells. This number is taken as the number of cells within a sub-sector. Thus, the footprint of the satellite (at the equator) is equivalent to the area of one sub-sector. These sub-sectors are grouped into eight sectors.

Figure 2:
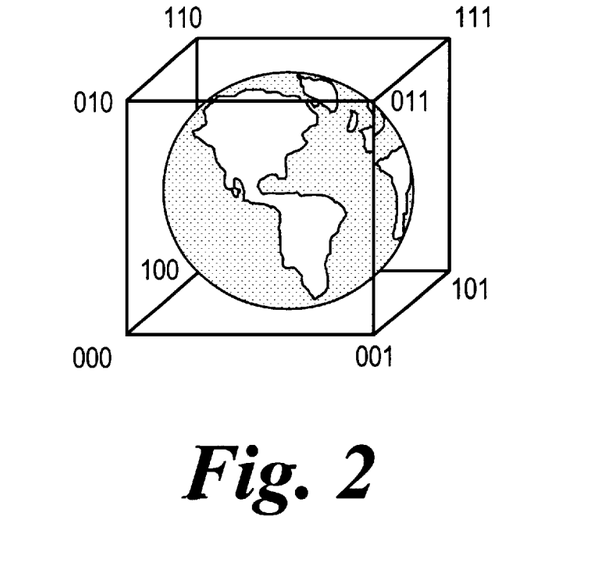
FIG. 2 illustrates a Gray code addressing scheme employed in the network of FIG. 1.

The eight sectors are identified each with a respective binary Gray-code as shown in FIG. 2. This assumption transforms the topology three dimensional Earth problem into a two dimensional routing problem. The codes for adjacent sectors differ by only one of the three bits.

For the three-bit sector assignation, the first or most significant bit will subsequently be referred to as the left bit, the second bit as the up bit and the third bit as the right bit. It will of course be appreciated that this purely arbitrary naming of bits is intended for the purposes of facilitating the understanding of the technique so as to simplify the comprehension of the routing algorithm.

Figure 3:
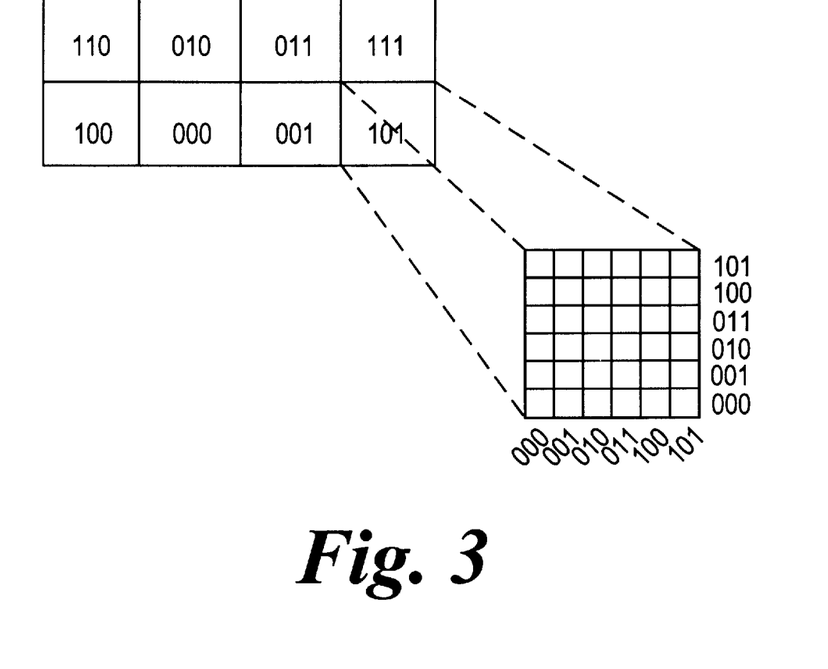
FIG. 3 illustrates a sub-sector addressing scheme employed with the addressing scheme of FIG. 2.

Every sector is divided, for example, into thirty six sub-sectors as illustrated in FIG. 3, and these sub-sectors are each identified respectively with six more bits. These bits are assigned according to a two-dimensional X-Y plane with three bits used for each axis as shown in FIG. 3. Finally, within the sub-sector the individual cells are identified in a similar way, but this time five bits are used for each axis. It will of course be understood that alternative bit allocation schemes can be employed.

In the present exemplary arrangement, the whole surface of the Earth is thus divided into eight sectors, four in the Northern hemisphere and four in the Southern hemisphere, and each sector is in turn divided into thirty six sub-sectors, where each sub-sector comprises three hundred and sixty four cells. This scheme thus embodies a total cell address length of nineteen bits, which facilitates the hardware-implementation of the algorithm.

The procedure that assigns every packet to a specific link is referred to as a transmission routine. The input parameters for this procedure are one or two pointers to the respective ISLs that have been selected as the best for the packet to use. When only one ISL has been given as an input parameter, the routine will deliver that packet to the specified link. If two ISLs have been given, the routine will deliver the packet to the least congested one. For example, the routine checks the status of a queue-length threshold indicator for the specified link. If that indicator is not active, then the routine delivers the packet to the specified link buffer. If the indicator is active and another link was specified, then the routine attempts to send the packet through this other link.

Figure 7:
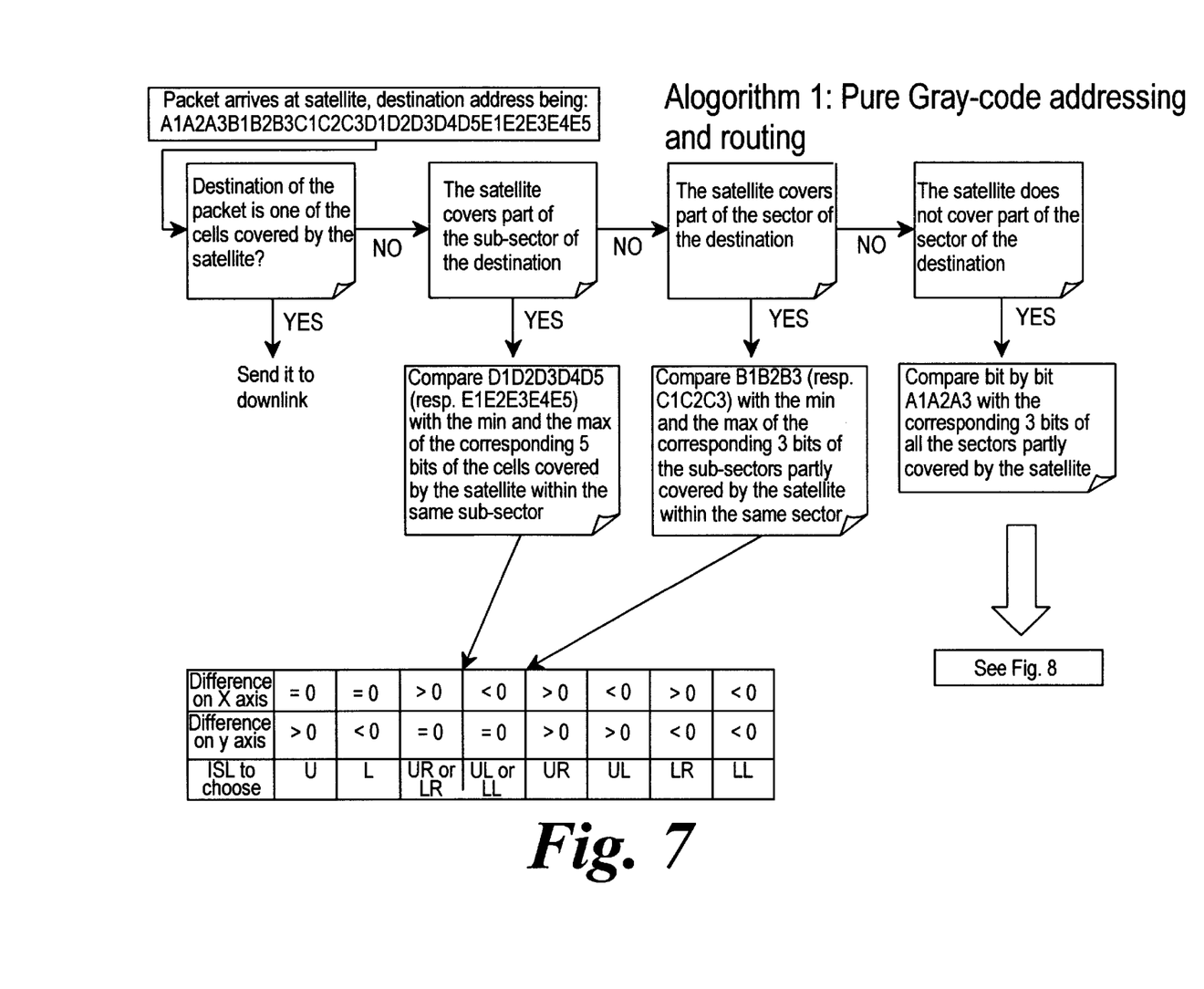
FIGS. 7 and 8 illustrate a first routing algorithm.
Figure 8:
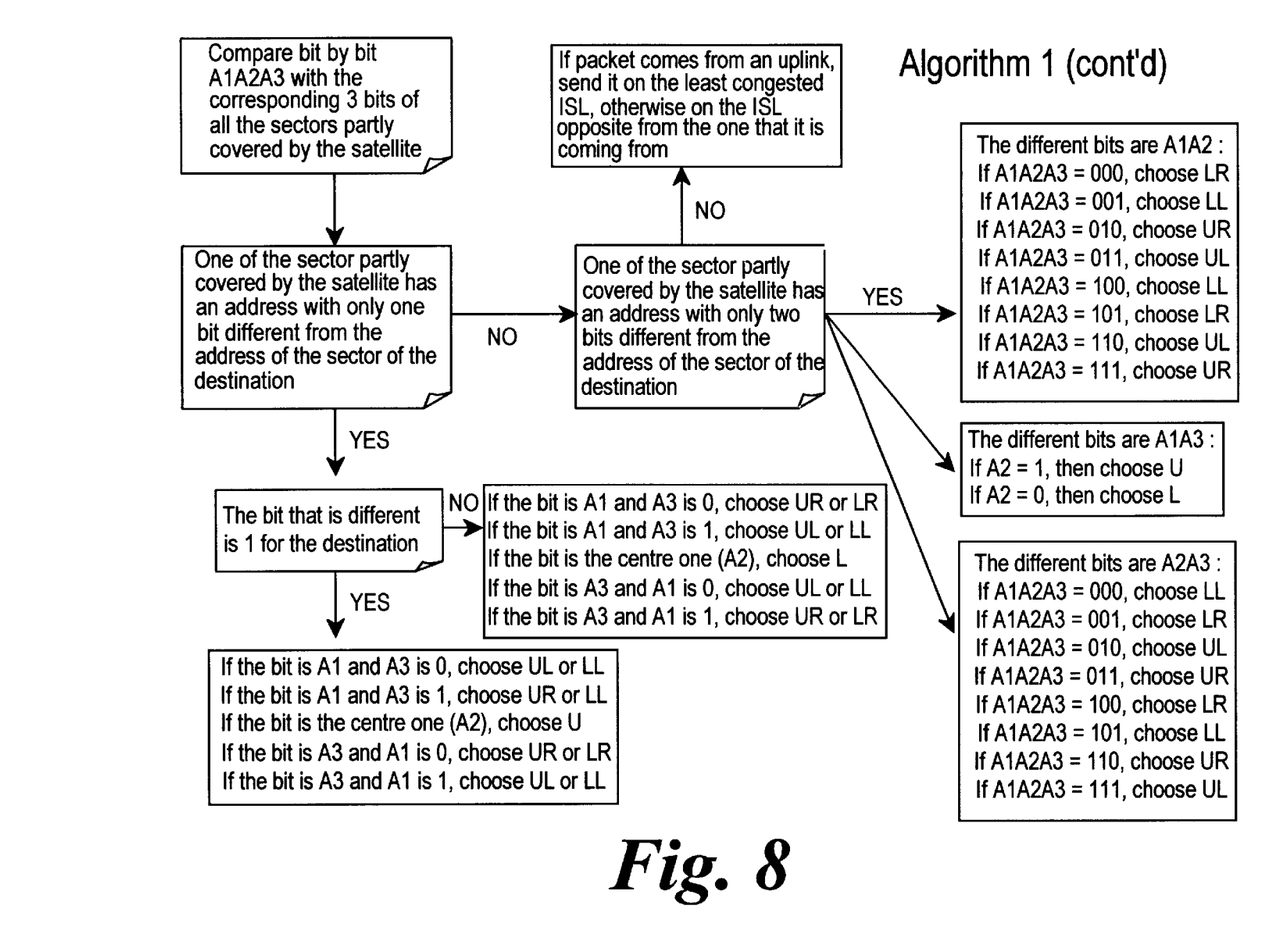
Figure 9:
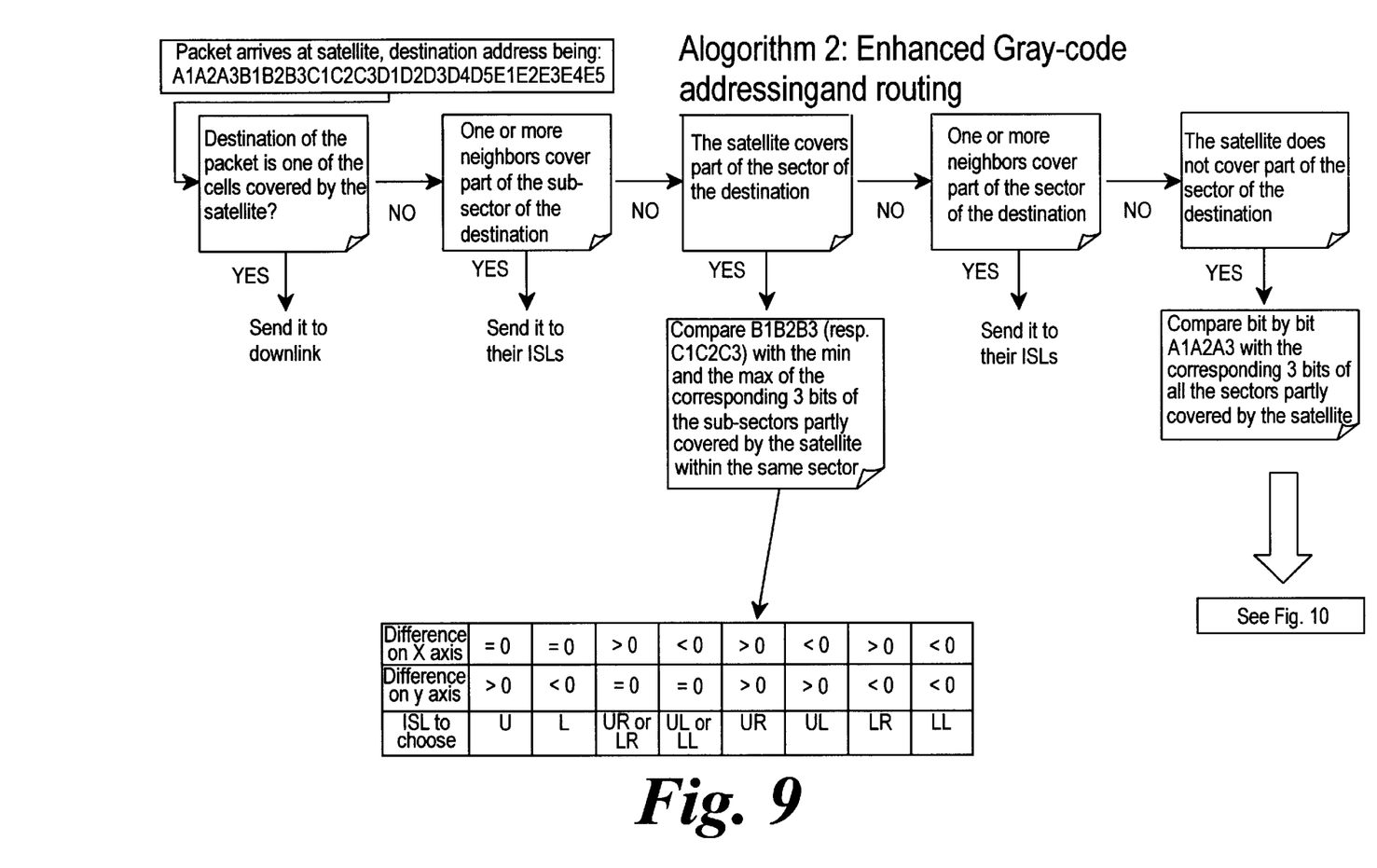
FIGS. 9 and 10 illustrate a further routing.
Figure 10:
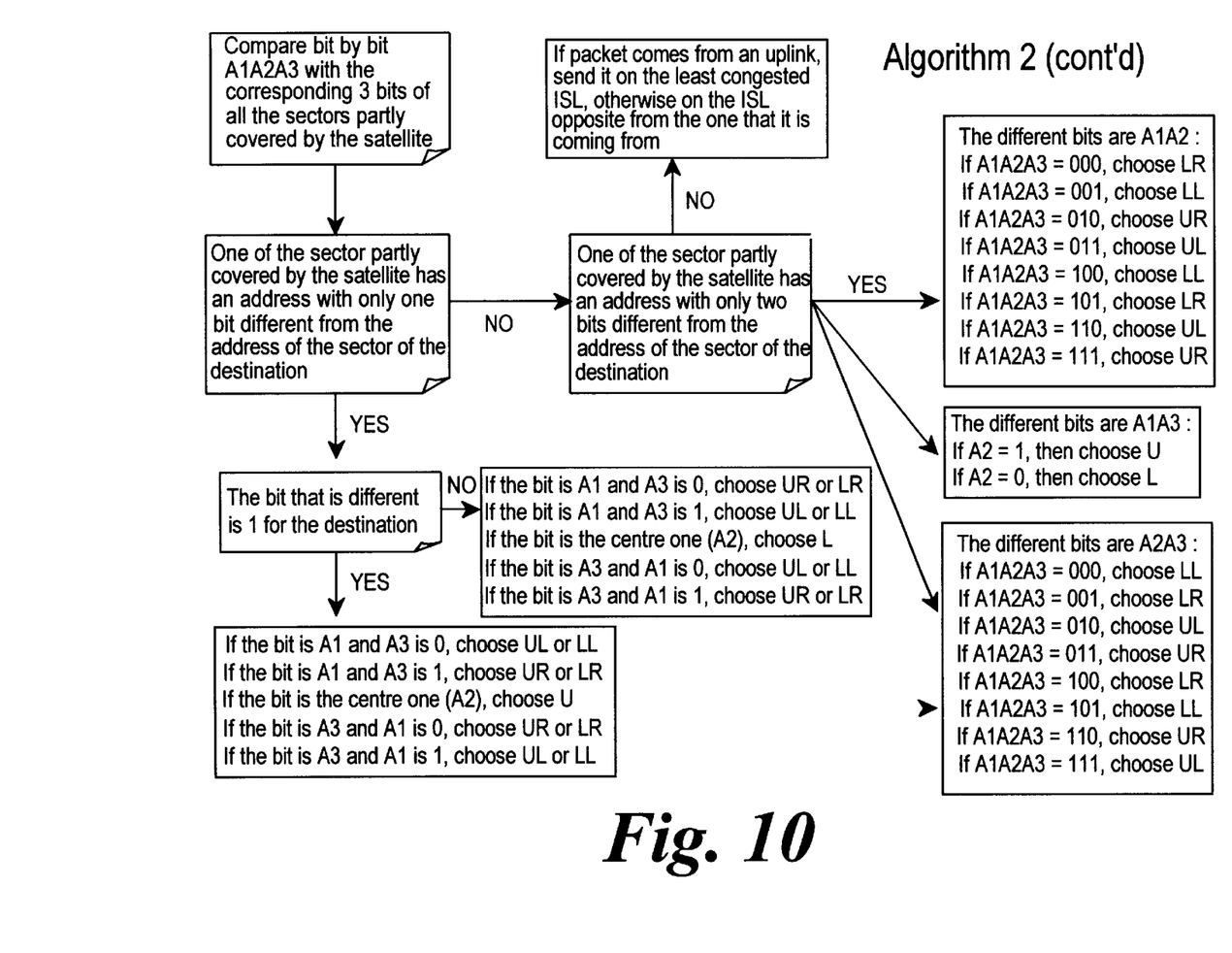

We employ two classes of routing algorithms with the Gray code addressing scheme. The first one does not require any exchange of information between satellites while the second one requires each satellite to know the sector and sub-sectors partly covered by its neighbours. FIGS. 7 and 8 illustrate the first algorithm and FIGS. 9 and 10 illustrate the second algorithm.

Initialisation

Before starting the routing procedure, the satellite must know its own current location. A satellite cannot cover more than four sub-sectors (where each one could be in a different sector) or three hundred and sixty four cells at a given time, so it is necessary to store the identity of each of these that are currently covered. In our arrangement, a four-register table is used to store the sectors and sub-sectors covered. A second table is used to store all the cells covered, where every cell must be related to one of the sectors or sub-sectors on the first table. Each time the coverage of the satellite changes, the new sector, sub-sectors and cells being covered are stored and the ones that are no more covered are erased.

Each satellite also needs to know which are its currently active ISLs and their directions. There cannot be more than six active ISLs at any one time and, for the second algorithm each one of these ISLs must be associated with the corresponding sectors and sub-sectors covered by the satellite at the other end of the link.

After knowing the active ISLs and, for the second algorithm their corresponding sectors and sub-sectors, each ISL is then associated with its physical direction.

For the second algorithm, it is not necessary to exchange information between satellites unless a sub-sector hand-over is performed, in which case all neighbour satellites (six at most) are informed about the new sectors and sub-sectors that are being covered.

Arrival of a Packet

When a packet arrives at a satellite node, the destination address of the packet (represented in FIG. 11) is compared with the tables that have been stored in the node. Firstly, the first three bits of the destination address, corresponding to the destination sector are identified and compared. According to the result of this comparison, the satellite performs a specific task, which can be a sector routing or a comparison of the sub-sector bits. According to the result of this second comparison, the satellite performs either an inter sub-sector routing or a comparison of the cell bits. According to the result of this third comparison, the satellite performs either a local routing or an intra-sub-sector routing. The result of a local routing is to send the packet on one of the downlinks of the satellite while all the other routings result in sending the packet on an ISL.

Sector Routing (Different Sector and Sub-sector)

For algorithm 1 (FIGS. 7 and 8), if the packet belongs to a different sector or sub-sector than the ones currently being covered by the satellite, then the algorithm compares the distance between the packet sector address and each of the sector addresses stored.

For algorithm 2 (FIGS. 9 and 10), if the packet belongs to a different sector or sub-sector than the ones currently being covered by the satellite or those currently covered by the adjacent or neighbouring satellites, then the algorithm compares the distance between the packet sector address and each of the sector addresses stored.

For algorithm 2, if any of these neighbours has a closer address (i.e. a greater number of bits corresponding to the destination address than the other addresses), then the transmission routine is invoked and the one or two ISLs, corresponding to the closer satellite that is covering the sector or sub-sector, are specified as input for the routine. Otherwise, if neither sector nor sub-sector can be related to a better route, the routing is based only on the destination sector-address of the packet.

In that case and for algorithm 1, as the routing comparison is based only on the sector addresses, there can be one, two or three bits of difference between the closest of the actual satellite sector-addresses and the sector-address of the packet. In order to perform this task, it is thus necessary to determine how many bits are different and the position that they occupy compared to the actual sector where the satellite is located.

For a difference of one bit, we firstly have to identify the position of the bit and determine whether the difference of the bit is positive or negative. For instance, if the different bit is the left bit, then we are in an even sector, and the difference is positive, in which case we invoke the transmission routine and give the two left links as input. If the different bit is the up bit and it has a negative difference, then we assign the packet to the lower intra-plane link. This procedure gives more traffic to the intra-plane link than it gives to the inter-plane links, (i.e. 50% of this kind of traffic will be routed through the upper and lower ISLs, whereas the other 50% of the traffic will be routed to the four lateral ISLs). Since the intra-plane links are the only ISLs that are permanently established, it is a reasonable assumption to rely on these links in preference to the inter-plane ISLs.

For the case when there is a difference of two bits we follow the same procedure, but this time there are two possible directions as a result. If it is the up bit and any side bit that diverge from the actual address, then the inter-plane ISL that combines the two options is assigned as an input to the transmission routine. For instance, if the right bit and the up bit are the ones that do not match with the actual address, then we assign the packet to the upper-right ISL. If the right bit and left bit are different, then theoretically we could send the packet in either of the two side directions. According to the real topology of the network, the best option in this case is to send the packet over the same orbit plane in the correct direction. Thus, if the current and given position are 0 for the up bit, that means that there will be fewer hops over the same hemisphere, so the packet is assigned to the lower intra-plane link.

When there is a difference of three most significant bits, this signifies that the destination sector of the packet is completely at the other side of the Earth, so theoretically the packet can be sent in any direction. In this case if the packet arrived from a cell up-link, then the less congested link is assigned to the transmission routine. If the packet arrived from any one of the ISLs rather than via the up-link, then it should preferably be assigned to the opposite ISL, otherwise the packet may take longer to leave the sector.

Inter Sub-sector Routing (Same Sector and Different Sub-sector)

When the destination of the packet is within any of the sectors covered by the satellite but the sub-sector is not, then the sub-sector level addressing is used. In order to locate the corresponding sub-sector, the packet destination sub-sector address is compared to the closest sub-sector covered by the satellite within the same sector. Note that the satellite can cover more than one sub-sector within the same sector. Then, a distance is calculated between the packet destination sub-sector and the closest sub-sector covered by the satellite that was taken as reference. This distance will give two values corresponding to the X and Y-axis and, according to these obtained values, the routing procedure is carried out as described below.

For example, when the distance on the Y-axis is greater than zero and the distance on the X-axis is equal to zero, then the transmission routine is invoked and the upper link is assigned. When the distance on the Y-axis is equal to zero and the distance on the X-axis is greater than zero, then the transmission routine allocates both right links. Similarly, if the distance on the Y-axis is greater than zero and the distance on the X-axis is greater than zero, then the transmission routine allocates the upper-right link, and so on.

Intra Sub-sector Routing and Local Routing

If the destination sub-sector of the packet corresponds to any of the sub-sectors covered by the satellite, then the algorithm checks whether the cell is within the domain of the satellite.

For algorithm 2, when the satellite is not covering the cell, then the next hop will depend on the number of neighbouring satellites with which the sub-sector is being shared. The maximum number of satellites that can share a sub-sector is four. Hence, the maximum number of links that can lead to the same sub-sector is three. When one or three links are leading to the same sub-sector, the procedure is used in the same fashion. For the case when three links lead to the same sub-sector, the central one is assigned by the transmission routine. When two links lead to the same sub-sector, then both links are taken into account.

For algorithm 1, if the destination cell address is not within the domain of the satellite but the sub-sector address is, the closest cell-address stored in the satellite's cells table is used as a reference by the algorithm. The distances are calculated again and a similar procedure to the one used for the inter sub-sector routing is applied.

If the distance on the Y-axis is smaller than zero and the distance on the X-axis is equal to zero, then the transmission routine assigns the lower link. Alternately, for the case when the distance on the Y-axis is equal to zero and the distance on the X-axis is smaller than zero, the transmission routine assigns both left links. If the distance on the Y-axis is greater than zero and the distance on the X-axis is greater than zero, then the transmission routine assigns the upper-right link, and so on.

If the satellite covers the destination cell of the packet, then we use a local routing. In this case the packet is simply delivered directly to the down-link beam (or the time slot, depending on the technique used) that corresponds to the destination cell.

The efficacy of the Gray-code addressing scheme described above, has been evaluated in a simulated network wherein four satellites compose each sector and each satellite covers a sub-sector equivalent to 10 cells. In this simulated network, each satellite has six possible ISLs that are thus interconnected in a network mesh fashion. The connection between the satellite and the cells is made through full-duplex links, one per cell. All of them have the same capacity and characteristics, regardless whether the satellite has the entire set of ISLs active or not.

Each satellite and its cells form a sub-network of the complete satellite network. All the satellites are identical and cover the same number of cells. The cells are identical as well, so three hundred and twenty cells compose the complete earth segment. All of them generate and receive traffic, simulating thus the terminals of the network.

Earth Cell

The functions carried out by the cell are: generation of packets, shaping and addressing of packets, transmission of packets to the satellite, reception of packets from the satellite, and analysis and generation of statistics of received packets.

The packets are generated individually and with a constant size distribution. The ideal source generator creates packets with an exponential probability density function (pdf) inter-arrival time, which equivalently can be seen as a stream of Poisson-distributed messages at the average rate of $\mu$ per unit time. Hence, the packet inter-arrival mean time is $\lambda=1/\mu$, giving the exponential pdf of $f_x(x)=\lambda e^{-\lambda x}$, $\forall x \geq 0$. An inter-arrival mean time of 0.1 sec is assumed, generating an infinite stream of constant-size packets. Once the packets are generated, they are sent to the cell processor.

The cell processor is a finite state machine that has been designed to give the corresponding format to the incoming packets from the source. The cell processor finite state machine has four states, where three of them are forced and one is not. The states are linked with transitions that conditionally make the process change form one state to another.

The Initialisation state is in charge of learning the actual position of the satellite, by obtaining the sector and sub-sector being covered. In the real system this would happen the other way round, when the satellite has to know its actual position according to the actual fixed-earth cells covered. For simulation purposes this has been changed, since the assumption does not affect the behaviour of the routing algorithm.

The Idle state is the state in which the process waits for an event to happen. This event can be the arrival of a packet either from the packet generator, or form the satellite receiver. Depending on whether a packet arrives from the source generator or from the down-link, the process changes to a different state. For the first case, the packets received from the source generator are shaped, the origin address is recorded, and a uniform pdf is used to assign a destination address to them. The packets arrived from the down-link are analysed for the generation of statistics.

Satellite Switch

The satellite node is where the routing algorithms are implemented. Its functions are the reception of packets from ISLs and up-links, and their routing to a determined outgoing transmission link.

Firstly, the switch on-board is connected to receivers and transmitters for the communication with the cells by the up-links and down links. On the other hand, the switch is connected to further receivers and transmitters, this time corresponding to the ISLs. The ISL transmitters have an intermediate queue for the deflection scheme to be implemented.

In the satellite switch another finite state machine with five states is programmed. The Initialisation state registers the position of the satellite and then an Idle state awaits for the arrival of a packet. When a packet arrives from any of the incoming links, it is analysed by a decision state. Firstly, in order to register the number of crossings that the packet has made through a satellite switch, a hop-counter in the packet is incremented by one. Afterwards, the destination address is compared with the actual position of the satellite and depending on the destination sector and sub-sector address of the packet, the process changes to an external routing state or to a local routing state.

The external routing state implements the routing algorithm, comparing the destination sector and sub-sector addresses with the ones covered by the satellite and assigning a specific ISL in order to deliver the packet to the next satellite. On the other hand, the local routing state delivers the packet to its destination cell by assigning it to the corresponding down-link.

The number of real hops made by the packet with the Gray-code routing is compared with the shortest path computed off-line at the destination cell. The difference between the number of hops made by each packet routed by the algorithm and the number of hops corresponding to the shortest path is analysed and a cumulative distribution function (cdf) is presented, where:

$$\Delta d(OD_i) = GCR(OD_i) - SP(OD_i) \quad (5.1)$$

Figure 4:
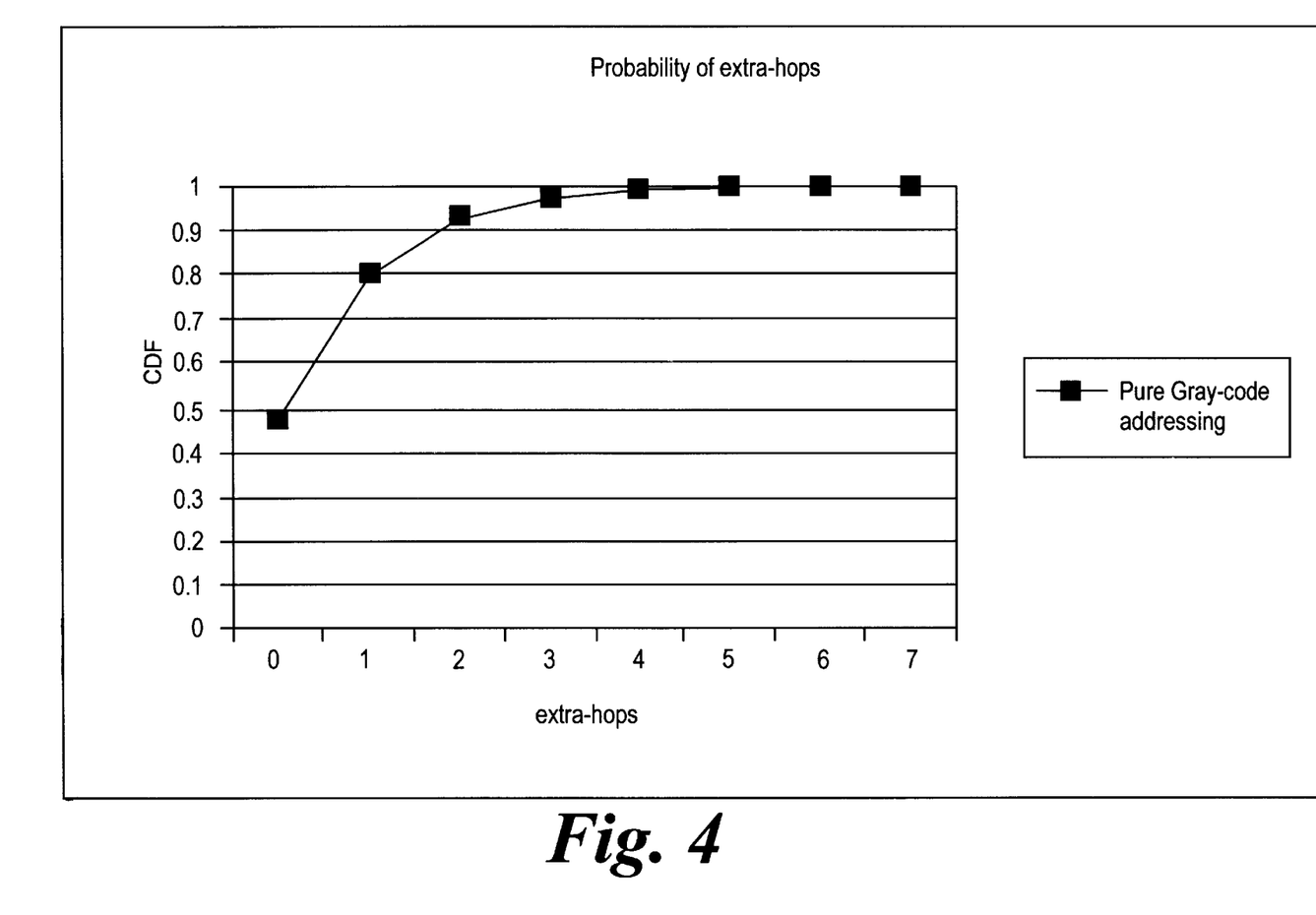
FIGS. 4 and 5 are graphs illustrating the statistical results of operation of the routing process using the Gray code addressing scheme.

As shown in FIG. 4 showing the performance of the first algorithm, the probability of having the same number of hops than the shortest path is 0.486, which means that almost 49% of the packets follow a route equivalent to the shortest path between the OD satellites. The next value shows that 80% of the packets will make at most 1 hop more than the shortest path to reach the destination. If the maximum number of hops considered is 3, then 93% of the packets will arrive in that range.

Figure 5:
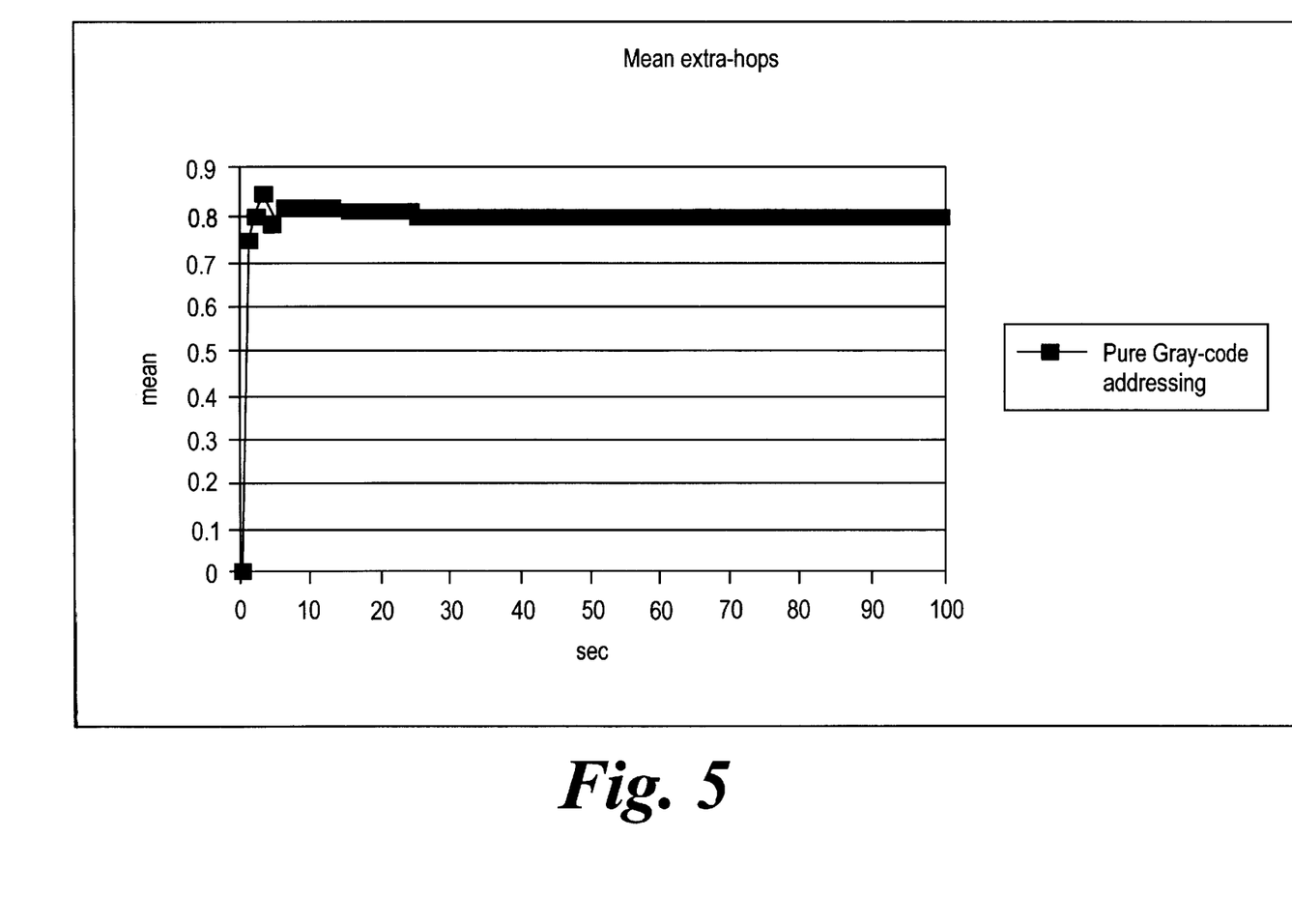

If we look at the mean number of hops in time in FIG. 5, we appreciate that the average number of extra hops is close to 0.8 and stable in time, which means that on average the packets are going to use 0.8 more hops than the shortest path. The additional delay introduced by this small number of extra hops is negligible.

It will of course be understood that the technique is in no way restricted to use with the two algorithms described above, and that further algorithms may be employed.

It will be understood that the above description of a preferred embodiment is given by way of example only and that various modifications may be made by those skilled in the art without departing from the spirit and scope of the invention.

What is claimed is:

1. A system wherein each satellite within a said group has permanent inter-satellite links with its immediate neighbours in that group.

2. An addressing scheme for a packet communications network comprising a plurality of sectors serviced via communications nodes whereby communications packets are routed, wherein each said sector is allocated a respective binary Gray code address, wherein adjacent sectors within the network have Gray codes differing by one bit, and wherein routing of a packet at each node within the network is determined from the difference between a said Gray code associated with the packet and a corresponding code stored at the node.

3. A satellite packet communications system comprising a plurality of ground based sectors serviced via satellite communications nodes, wherein said sectors are provided each with an address incorporating a binary Gray code, and wherein routing of a communications packet addressed to a said node is performed by comparison of the Gray code in the address with a corresponding code stored in the node, the number and bit position of the difference between said codes being used to determine the direction of routing of the packet to another system node or to its destination sector, wherein each said sector is further divided into sub-sectors each containing a number of cells, wherein said satellites are deployed in groups in a plurality of polar orbits, wherein each said cell has a respective binary code address within the sector, and wherein each said packet address contains the Gray code sector address as the most significant bits of the packet address.

4. A method or routing packet traffic in a communications network serving a plurality of service regions and comprising a plurality of non-stationary nodes interconnected via inter-nodal links, the method comprising allocating to each said service region a respective binary Gray code element, providing said Gray code element as a destination address in an information packet intended for that service region, and determining within a said node the difference between said Gray code and a corresponding code stored at the node whereby to determine from the number and bit position of the difference between said codes being used to determine the direction of routing of the packet to another system node or to its destination sector, wherein each said sector is further divided into sub-sectors each containing a number of cells, wherein each said cell has respective binary code address within the sector, and wherein each said packet address contains the Gray code sector address as the most significant bits of the packet address.

* * * * *